(12) United States Patent
Kuramkote et al.

(10) Patent No.: US 7,308,610 B2
(45) Date of Patent: Dec. 11, 2007

(54) METHOD AND APPARATUS FOR HANDLING ERRORS IN A PROCESSING SYSTEM

(75) Inventors: Rajendra Kuramkote, Newcastle, WA (US); Suresh Marisetty, San Jose, CA (US); Koichi Yamada, Los Gatos, CA (US); Scott Brenden, Bothell, WA (US); William Cheung, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 11/009,166

(22) Filed: Dec. 10, 2004

(65) Prior Publication Data

US 2006/0143515 A1 Jun. 29, 2006

(51) Int. Cl.
*G06F 11/00* (2006.01)
(52) U.S. Cl. ...................................................... 714/38
(58) Field of Classification Search ...................... None
See application file for complete search history.

(56) References Cited

U.S. PATENT DOCUMENTS

| | | | | |
|---|---|---|---|---|
| 5,528,750 | A * | 6/1996 | Lubart et al. | 714/15 |
| 6,622,261 | B1 | 9/2003 | Tien et al. | |
| 6,745,346 | B2 | 6/2004 | Quach et al. | |
| 6,836,855 | B2 * | 12/2004 | Arndt | 714/9 |
| 6,842,870 | B2 * | 1/2005 | Austen et al. | 714/48 |
| 6,948,094 | B2 * | 9/2005 | Schultz et al. | 714/15 |
| 7,007,200 | B2 * | 2/2006 | Salem | 714/26 |
| 2003/0126516 | A1 | 7/2003 | Komarla et al. | |
| 2004/0019835 | A1 | 1/2004 | Marisetty et al. | |
| 2004/0078667 | A1 * | 4/2004 | Salem | 714/26 |
| 2004/0139374 | A1 * | 7/2004 | Meaney et al. | 714/48 |
| 2004/0221189 | A1 | 11/2004 | Quach et al. | |
| 2006/0107125 | A1 * | 5/2006 | Hsu et al. | 714/100 |

OTHER PUBLICATIONS

U.S. Appl. No. 10/607,158, Identifying Affected Program Threads and Enabling Error Containment and Recovery, Yamada et al, unknown date.
www.only4gurus.com/3v/download.asp?ID=6316—Intel Itanium Processor Family Advanced Machine Check Architecture and Windows Server 2003.
http://sourcefrog.net/weblog/software/linus-kernal/ia64/mca.html—Jul. 28, 2003—IA-64 Machine Check Architecture.
www.intel.com/cd/ids/developer/asmo-na/eng/44023.htm?page=3—Intel and RASM Itanium Processor Family Machine Check Architecture, unknown date.

* cited by examiner

*Primary Examiner*—Nadeem Iqbal
(74) *Attorney, Agent, or Firm*—Michael R. Barre

(57) ABSTRACT

A processing system may include an operating system (OS) and one or more specialized error handling modules to be registered with the OS after the processing system is powered on. The OS may also include a master policy module. The specialized error handling module may collect error data from a component of the processing system, and may generate abstracted error data, based at least in part on the collected error data. The master policy module may determine a recovery action to be taken, based at least in part on the abstracted error data. The OS may also include an error collection routine that calls one or more specialized error handling modules in response to detecting a hardware error. The error collection routine may also retrieve information from firmware in response to detecting the hardware error. Other embodiments are described and claimed.

29 Claims, 3 Drawing Sheets

METHOD AND APPARATUS FOR HANDLING ERRORS IN A PROCESSING SYSTEM

FIELD OF THE INVENTION

The present disclosure relates generally to the field of data processing, and more particularly to methods and apparatuses for handling errors in processing systems.

BACKGROUND

A conventional data processing system may include hardware, such as processor and memory, and software, such as a basic input/output (I/O) system (BIOS) and an operating system (OS). When hardware errors occur, the hardware may report the errors to the OS. The OS may include control logic for handling the hardware errors.

In many circumstances, it would be beneficial to change the way hardware errors are handled. For instance, when new hardware is developed, it may be beneficial to modify the control logic to be used by the OS to handle hardware errors. In conventional processing systems, however, it may not be possible to modify the control logic for handling hardware errors without obtaining and installing a new version of the OS. Consequently, a significant amount of delay, effort, or both may be experienced by an individual or organization that desires to modify or upgrade control logic for handling hardware errors.

BRIEF DESCRIPTION OF THE DRAWINGS

The features and advantages of the present invention will become apparent from the appended claims and the following detailed description of one or more example embodiments, in which:

DETAILED DESCRIPTION

Figure 1:
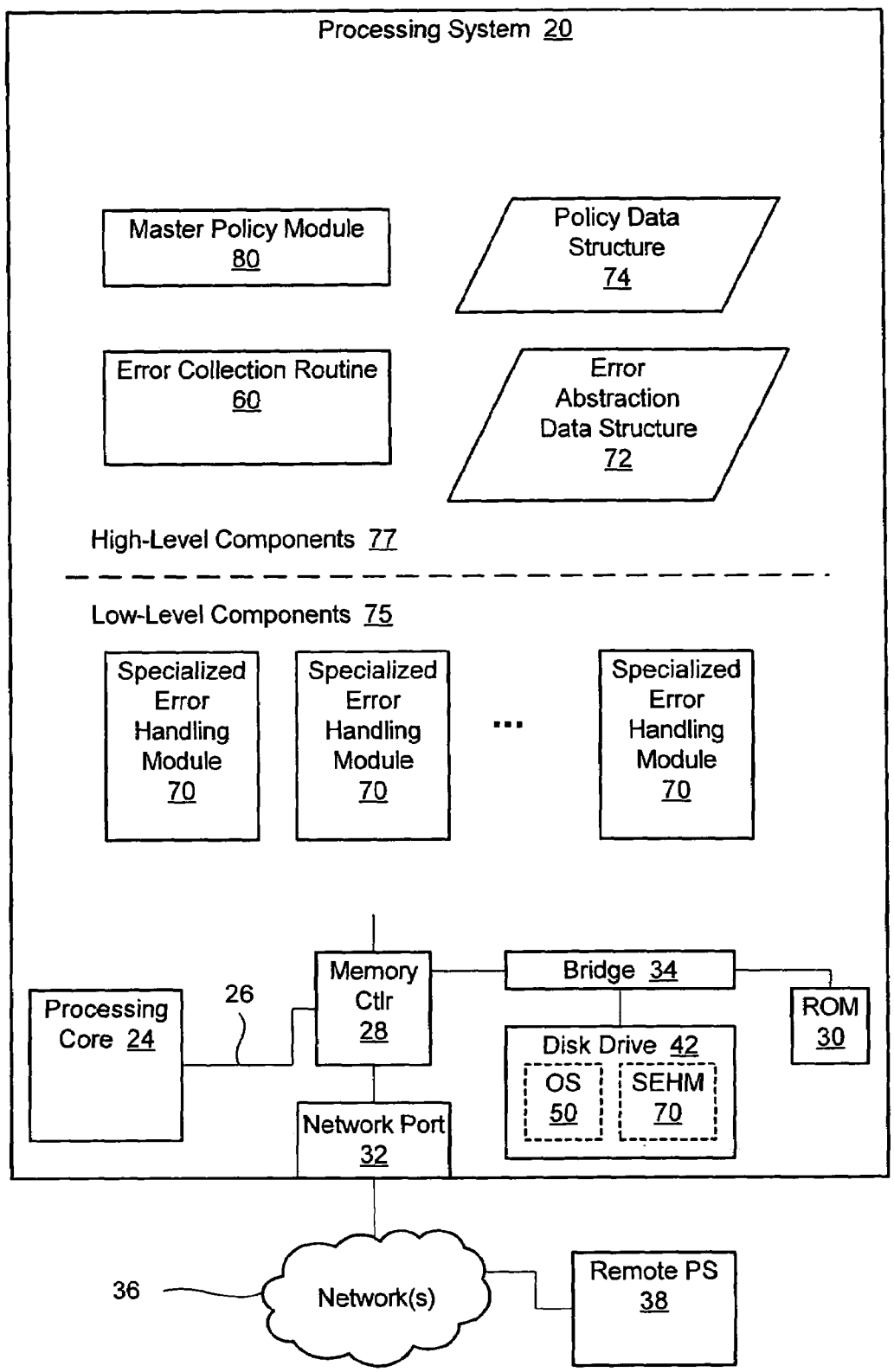
FIG. 1 is a block diagram depicting hardware and software in a suitable data processing environment to utilize a framework for handling hardware errors, in accordance with an example embodiment of the present invention.

FIG. 1 is a block diagram depicting example hardware and software components in an example data processing environment to utilize a framework for handling hardware errors, in accordance with an example embodiment of the present invention. FIG. 1 and the following discussion are intended to provide a general description of a suitable environment in which certain aspects of the present invention may be implemented. As used herein, the terms "processing system" and "data processing system" are intended to broadly encompass a single machine, or a system of communicatively coupled machines or devices operating together. Exemplary processing systems include, without limitation, distributed computing systems, supercomputers, computing clusters, mainframe computers, mini-computers, client-server systems, personal computers, workstations, servers, portable computers, laptop computers, tablet processing systems, telephones, personal digital assistants (PDAs), handheld devices, mobile handsets, entertainment devices such as audio and/or video devices, and other devices for processing or transmitting information.

The data processing environment of FIG. 1 may include a processing system 20 that includes one or more processors or central processing units (CPUs) 24 communicatively coupled to various other components via one or more buses or other communication conduits or pathways. Processor 24 may be implemented as an integrated circuit (IC) with one or more processing cores. The components coupled to processor 24 may include one or more volatile or non-volatile data storage devices, such as random access memory (RAM) 22 and read-only memory (ROM) 30. One or more buses 26 may serve to couple RAM 22 and ROM 30 with processor 24, possibly via one or more intermediate components, such as a memory controller 28, a bus bridge 34, etc. For purposes of this disclosure, the term "ROM" refers in general to non-volatile memory devices such as erasable programmable ROM (EPROM), electrically erasable programmable ROM (EEPROM), flash ROM, flash memory, non-volatile RAM (NV-RAM), etc.

Processor 24 may also be communicatively coupled to mass storage devices, such as one or more integrated drive electronics (IDE) drives, small computer systems interface (SCSI) drives, or other types of hard disk drives 42. Other types of mass storage devices and storage media that may be used by processing system 20 may include floppy-disks, optical storage, tapes, memory sticks, digital video disks, biological storage, etc.

Additional components may be communicatively coupled to processor 24 in processing system 20, including, for example one or more of each of the following: video, SCSI, network, universal serial bus (USB), and keyboard controller; other types of device controllers; input/output (I/O) devices; network ports 32; and other I/O ports. Such components may be connected directly or indirectly to processor 24, for example via one or more buses and bus bridges. In some embodiments, one or more components of processing system 20 may be implemented as embedded devices, using components such as programmable or non-programmable logic devices or arrays, application-specific integrated circuits (ASICs), embedded computers, smart cards, and the like.

Processing system 20 may be controlled, at least in part, by input from conventional input devices, such as a keyboard or keypad, a pointing device, etc., and/or by directives received from one or more remote data processing systems 38, interaction with a virtual reality environment, biometric feedback, or other input sources or signals. Processing system 20 may send output to components such as a display device, remote data processing system 38, etc. Communications with remote data processing system 38 may travel through any suitable communications medium. For example, processing systems 20 and 38 may be interconnected by way of one or more physical or logical networks 36, such as a local area network (LAN), a wide area network (WAN), an intranet, the Internet, a public switched telephone network (PSTN), a cellular telephone network, etc. Communications involving network 36 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which, when accessed by a machine, result in the machine performing tasks or defining abstract data types or low-level hardware contexts. Such data may be referred to in general as software, and it may be stored in volatile and/or non-volatile data storage.

For example, one or more storage devices accessible to or residing within processing system 20, such as disk drive 42, may include some or all of an OS 50 to be loaded into RAM 22 when processing system 20 is powered up, for example as part of a boot process. Disk drive 42 may also include one or more specialized error handling modules 70 to be registered with OS 50 and used for handling hardware errors as described below. Specialized error handling modules 70 may also be referred to as specialized hardware error handling modules 70. For purposes of this disclosure, such modules may also be referred to simply as specialized modules 70.

Specialized error handling modules 70 may be modular components for use within a modular framework for handling hardware errors. The different components of the modular framework may handle different responsibilities, and each component within the framework may interact with one or more other components through appropriate interfaces. The modularity may also facilitate extensibility. As described in greater detail below, components within the framework may provide for OS-level abstraction of raw error information. The modular design may also allow key error handling components to be dynamically upgraded without affecting the main OS software components. For instance, the modular framework may be used to provide new support for error handling and to provide error handling for new hardware platforms without requiring any changes to the core OS code.

In one embodiment, OS 50 includes at least two different levels of components for handling hardware errors. The high-level components 77 may utilize only architected features of the platform's hardware. The low-level components 75 may utilize both architected and unarchitected features of the platform's hardware. For purposes of this document, an architected feature of the platform's hardware is a feature of the hardware that is described in technical documentation which is made available to purchasers of the hardware, such as original equipment manufacturers (OEMs). Such technical documentation may include, for example, hardware datasheets, software developer's reference manuals, processor design guides, platform design guides, etc. By contrast, an unarchitected feature is a feature that is either not disclosed in any technical documentation provided to purchasers of the hardware, or disclosed but only as an unsupported feature.

In the example embodiment, high-level components 77 include a general purpose error collection routine 60 and a master policy module 80. As described in greater detail below, error collection routine 60 calls specialized modules 70 in response to hardware errors, and master policy module 80 uses information such as abstracted error data to determine appropriate actions to be taken in response to the hardware errors. Specialized modules 70 may generate the abstracted error data and load that data into an error abstraction data structure 72, for use by master policy module 80. In addition, OS 50 may include predefined policy data that links or associates certain types of error conditions with corresponding actions to be taken in response. Such policy data may be stored in a repository such as a policy data structure 74. In the example embodiment, policy data structure 74 is implemented in a manner such that its contents can be updated independent of the OS, to facilitate changing or adding actions for error conditions as hardware/firmware changes permit.

In the example embodiment, high-level components 77 may access the architected registers to obtain data in accordance with a published reference manual for processor 24, and low-level components 75 include specialized error handling modules 70, which may obtain data from both architected and unarchitected features of the hardware components of processing system 20. Unlike high-level components, low-level components 75 may access the unarchitected registers to obtain information that is not available from the architected features.

For instance, processor 24 may include architected registers that high-level components 77 can use to determine that a processor error is due to a bus interface error, and processor 24 may include unarchitected, or implementation specific, registers that low-level components 75 can query directly to determine the type of bus interface error (e.g., hard fail on transaction or bus initialization (BINIT)). One of the specialized error handling modules 70 may be designed to handle processor errors, and when that specialized module is called, it may retrieve information for the architected registers, telling if there was a bus interface error, from the firmware error record, and it may query implementation specific information from the unarchitected registers to determine the type of bus interface error.

In another example, a platform may include a processor socket and circuitry that allows cache memory to be shared by two different cores of a processor installed in the socket. In addition, the platform may include multiple sets of model-specific registers (MSRs) for logging errors on behalf of each core. One or more specialized modules 70 may obtain information from the individual MSR's, collate or aggregate that information, and generate a summary of the error or errors from the collated data. In other circumstances or embodiments, specialized modules 70 may obtain data from other unarchitected features in processor 24 or in other hardware components.

Figure 2:
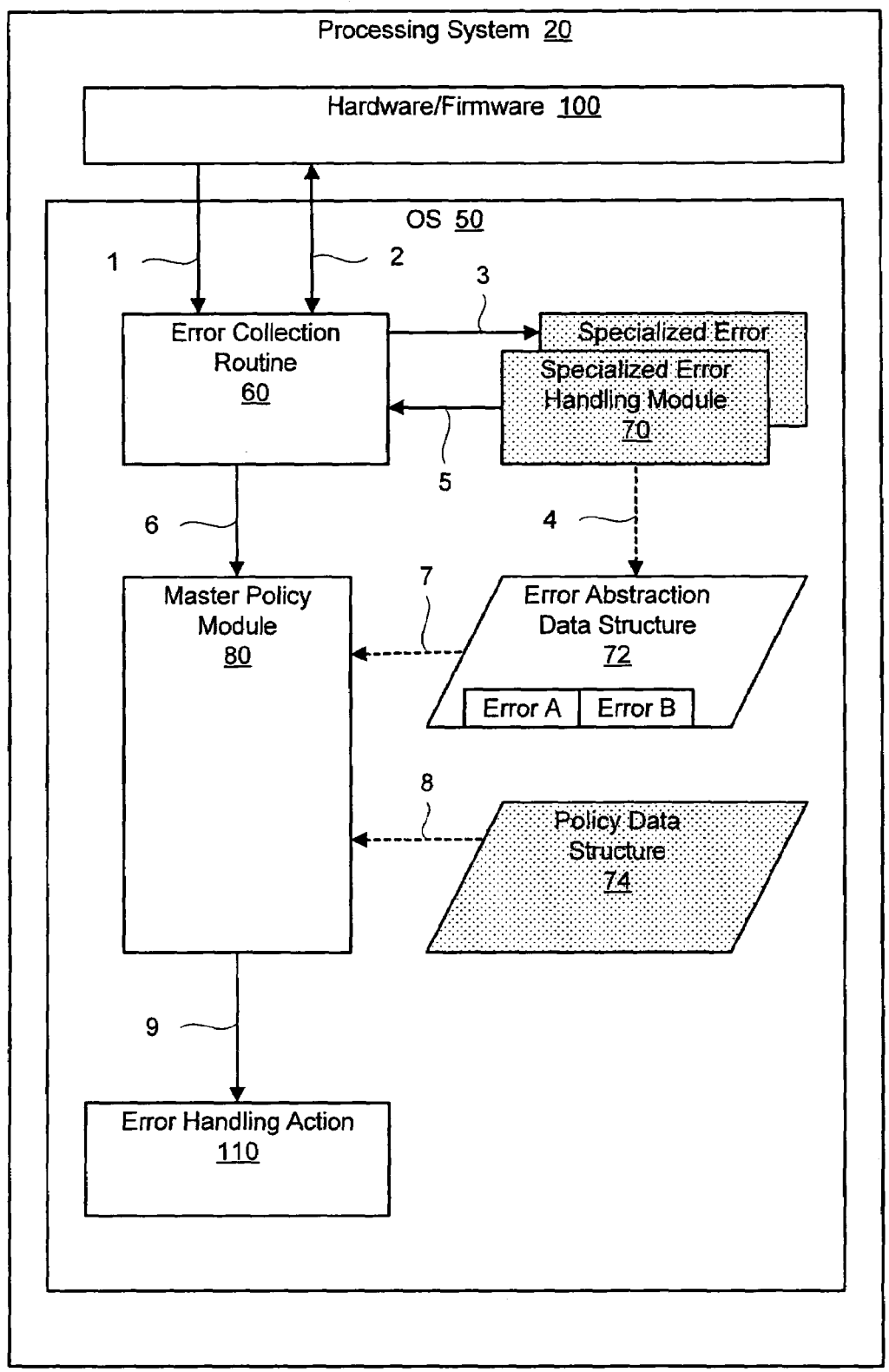
FIG. 2 is a block diagram depicting a sequence of interactions between some of the components from the data processing environment of FIG. 1, in accordance with an example embodiment of the present invention.

FIG. 2 is a block diagram depicting a sequence of interactions between some of the components from the data processing environment of FIG. 1, in accordance with an example embodiment of the present invention. The modular error handling framework of OS 50 may operate generally on top of the hardware and firmware 100 of processing system 20. In the illustrated embodiment, processing system may use a machine check architecture (MCA), and firmware 100 may include components such as a processor abstraction layer (PAL), a system abstraction layer (SAL), and a modular platform framework complying with a specification such as the Extensible Firmware Interface (EFI) specification. Version 1.10, update 001, of the EFI specification, dated Nov. 26, 2003, may be obtained from the Internet at www.intel.com/technology/efi/main_specification.htm#update. However, in other embodiments, other architectures, firmware components, and/or frameworks may be used.

The arrows in FIG. 2 represent a sequence of operations or interactions involving one or more of the depicted components. In particular, arrow 1 illustrates OS 50 receiving a signal indicating that a hardware error has occurred. OS 50 may receive that signal from the hardware or firmware of processing system 20, and the signal may be a machine check signal or a hardware interrupt, for example. In the example embodiment, the OS entry point that receives the error is error collection routine 60. Error collection routine 60 may also be referred to as a generic error collection routine, a generic error handling routine, or a generic OS error handler. For purposes of this document, a generic routine is a software component that is designed to handle multiple types of errors, and that does not access unarchitected platform features.

Arrow 2 illustrates error collection routine 60 calling firmware 100 in response to the machine check or interrupt, to obtain information about the error from firmware 100. In response, firmware 100 may query some or all hardware components in processing system 20 to obtain information about all errors that have happened. After collecting any available error data from firmware 100, error collection routine 60 may call one or more specialized error handling modules 70, as indicated by arrow 3. As described in greater detail below, OS 50 may register specialized error handling modules 70 during a boot process for processing system 20 or at some other time after processing system 20 has been powered on. In one embodiment, error collection routine 60 iteratively calls each of the registered specialized modules 70 after receiving the error signal. In an alternative embodiment, error collection routine 60 calls only a subset of the registered specialized modules 70. For instance, error collection routine 60 may call one subset of specialized modules 70 in response to one type of hardware error, and another subset in response to a different type of hardware error.

When error collection routine 60 calls specialized modules 70, error collection routine 60 may pass the error information that was received from firmware 100 to specialized modules 70. Each specialized error handling module 70 may then perform raw error processing. For example, specialized modules 70 may analyze the error data that was supplied to error collection routine 60 by firmware 100. Alternatively or in addition, specialized modules 70 may obtain information associated with the hardware error or errors, such as information pertaining to the current state of processing system 20, from unarchitected features of the platform, such as unarchitected registers in processor 24. Specialized modules 70 may analyze or parse the raw error information (e.g., the firmware data received from error collection routine 60 and the data retrieved directly from the hardware) to generate abstracted error data. For instance, specialized modules 70 may isolate errors to an errant component. As indicated by arrow 4, specialized modules 70 may load the abstracted error data into error abstraction data structure 72. However, when a specialized module 70 is called for an error that is not owned by that specialized module, the specialized module may simply immediately return control to error collection routine 60.

In the example embodiment, error abstraction data structure 72 is a generic information structure, in that it has a standard format for specialized modules 70 to provide information to error collection routine 60 and/or master policy module 80. Also, error abstraction data structure 72 may have fields to accommodate sufficient details regarding hardware errors to allow OS 50 to determine and implement appropriate error reporting or other error handling actions. However, error abstraction data structure 72 need not accommodate all of the raw error information processed by specialized modules 70.

As depicted by Error A and Error B within error abstraction data structure 72, multiple errors may be discovered during the process of collecting error data, and information for each of those errors may be loaded into different sections of error abstraction data structure 72. For instance, in response to a processor error, OS 50 may call a specialized module 70 for handling processor errors, as well as a specialized module 70 for handling memory errors. The specialized module 70 for handling memory errors may discover that a memory error has also occurred. Specialized modules 70 may load abstracted error data for the processor error into Error A, and abstracted error data for the memory error into Error B. Thus, specialized modules 70 may provide error abstraction data structure 72 with aggregated error data. Since the aggregated error data may involve errors from more than one hardware component, error abstraction data structure 72 may be said to provide a global view of the errors that have happened in processing system 20.

In one embodiment, error abstraction data structure 72 may include different fields for some or all of the following types of information:
the affected hardware component (e.g., CPU, memory, I/O);
subcomponent information (e.g., CPU cache)
the severity of the error (e.g., has already been corrected, recoverable, fatal)
the affected address;
the operation type (e.g., memory read, memory write);
the instruction pointer of the program running at the time of the error; etc.

In addition, specialized modules 70 may provide OS recovery action hints, for instance by loading action hints into error abstraction data structure 72. The action hints may serve as suggestions to master policy module 80, regarding the actions that should be taken in response to particular errors. For example, in different circumstances, specialized modules 70 may provide actions hints to log the error only, to mark the affected page of memory offline, to kill the process that had the error, or to failover to a backup hardware component.

In the example embodiment, processing system 20 includes multiple specialized error handling modules 70, with each module specialized having specific intelligence about particular hardware components on the platform. For instance, one specialized module may include control logic for processing raw error information pertaining to processor errors, a second may include control logic for processing raw error information pertaining to chipset errors, a third may include control logic for handling memory errors, etc. Specialized error handling modules 70 may be developed and supplied by the same hardware vendor or vendors that supplied the hardware for processing system 20, or by an OEM that manufactures processing systems with components from hardware vendors and OS vendors, for instance.

As indicated by arrow 5, after the last specialized module 70 has finished, control may return to error collection routine 60. As indicated by arrow 6, error collection routine 60 may then call master policy module 80, passing it the OS-level error abstraction information populated by specialized modules 70. Master policy module 80 may then use error abstraction data structure 72 to identify all of the detected errors, and to determine and start the necessary OS recovery actions. For example, master policy module 80 may process all of the errors reported in error abstraction data structure 72, as indicated by arrow 7; and master policy module 80 may determine the necessary recovery actions by reference to policy data structure 74, as indicated by arrow 8.

As discussed above, policy data structure 74 may include data that links or associates certain types of error conditions with corresponding recovery actions to be taken in response. For instance, policy data structure 74 may include policy entries such as those listed below in Table 1.

TABLE 1

Example policy entries

| Error type | Sub-type | Severity | Extra Information | OS Action(s) |
|---|---|---|---|---|
| Processor | Multi-bit Cache | Recoverable | Address of error present and in application space. | Mark page containing address offline. Kill application. |
| Memory | Multi-bit | Recoverable | Address of error present. If processor error also reported it is at same address. | Mark page containing address offline. Continue. |
| Any | N/A | Fatal | N/A | Stop operation and print message. |

In addition, OS 50 may include policy preferences which specify how to reconcile actions hints from error abstraction data structure 72 with OS recovery actions in policy data structure 74. For instance, an OEM or a system administrator may set OS 50 to reconcile different action recommendation by adopting the more conservative recommendation, or OS 50 may be set to adopt the more aggressive recommendation. For example, a conservative action may be one that resets the system, while an aggressive action may be one that attempts recovery and continues with system execution.

As indicated by arrow 9, master policy module 80 may then implement the appropriate action, based on the information from error abstraction data structure 72 and policy data structure 74. Examples of the types of actions that master policy module 80 may take in response to different kinds of error conditions include logging the error, marking a page offline, killing or terminating an application, and resetting processing system 20.

Figure 3:
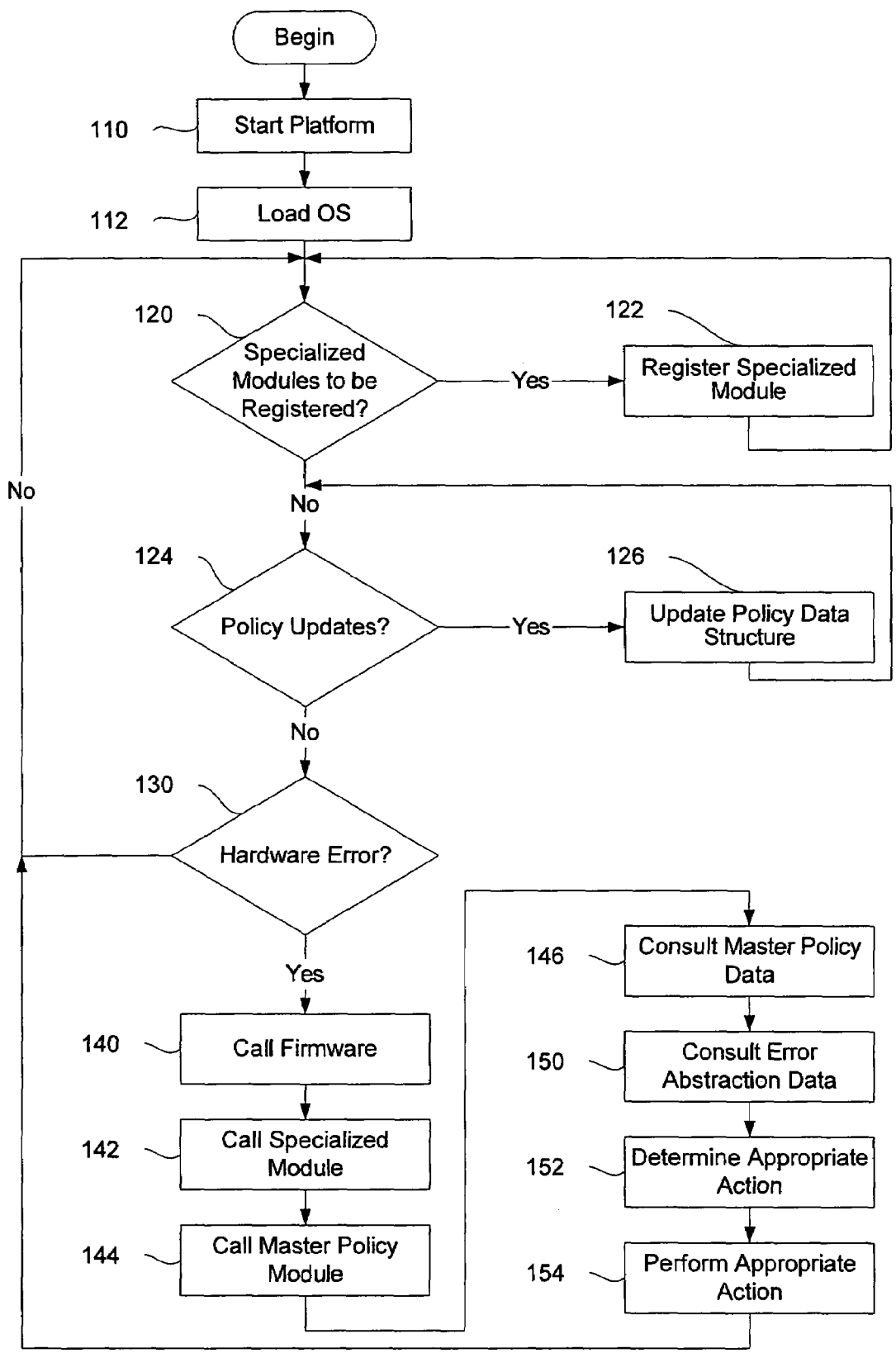
FIG. 3 provides a flowchart of a process for handling hardware errors, in accordance with an example embodiment of the present invention.

FIG. 3 provides a flowchart of a process for handling hardware errors, in accordance with an example embodiment of the present invention. The illustrated process may begin at block 110 with processing system 20 initiating a boot sequence, for instance in response to a power on or reset event. At block 112, processing system 20 may load OS 50. At block 120, OS 50 may determine whether there are any specialized error handling modules 70 to be registered. OS 50 may loop through blocks 120 and 122 to load and register all available specialized modules 70.

In the example embodiment, OS 50 provides a mechanism for specialized error handling modules 70 to be installed, loaded, and hooked into the error handling path. In one embodiment, processing system 50 registers specialized modules 70 with OS 50 through use of a model like that used for registering device drivers. In one embodiment, a mechanism such as an information (.inf) file may identify the specialized modules 70 to be loaded into RAM 22 and registered with OS 50. In the example embodiment, specialized error handling modules 70 may register with OS 50 during the boot process. In addition, specialized modules 70 may by loaded and registered dynamically after the boot process has completed. For instance, in an environment with a Microsoft Windows-based OS, functions such as start, stop, and unload may be used to dynamically register specialized modules 70.

After registering specialized modules 70, OS 50 may determine whether any policy updates should be applied to policy data structure 74, as indicated at block 124. OS 50 may then apply any such updates, as indicated at block 126. For instance, OS 50 may read a table at boot time or run time to discover errors and their corresponding OS actions to be supported at runtime. OS 50 may thus be dynamically updated to handle new errors, with the new errors to be mapped to an existing action category, for instance.

OS 50 may then determine whether a hardware error has occurred, as indicated at block 130. For instance, OS 50 may determine that a hardware error has occurred in response to receiving an error signal such as a machine check, as indicated above with regard to FIG. 2. If no error has occurred, the process may return to block 120, and OS 50 may determine whether any additional specialized error handling modules 70 should be registered, for instance in response to a request for dynamic loading of a specialized error handling module.

However, referring again to block 130, if a hardware error has been detected, error collection routine 60 may obtain information concerning the error from firmware at block 140, and may call one or more specialized error handling modules 70 at block 142, as discussed above. After the last specialized module 70 has finished, error collection routine 60 may call master policy module 80, as indicated at block 144. As discussed above and indicated at block 146, 150, and 152, master policy module 80 may then determine an appropriate action to be taken in response to the error or errors, based at least in part on (a) the abstracted error data for the error or errors that was loaded into error abstraction data structure 72 by specialized modules 70, and (b) the corresponding policy directives from policy data structure 74. As indicated at block 154, OS 50 may then implement the appropriate action.

For example, as indicated above in Table 1, if master policy module 80 determines, based on error abstraction data structure 72, that (a) the hardware error is a multi-bit memory error, (b) the error is recoverable, (c) the address of the errant data is currently present in main memory, and (c) any processor errors aggregated with the memory error are at the same address; master policy module 80 may determine that the appropriate actions are to mark the page containing the address as offline, removing the page from further OS use, and to continue processing, for instance by returning control to the routine that was executing when the memory error occurred. Similarly, if master policy module 80 determines that (a) there was a single processor error, (b) the error is recoverable, (c) there is a valid target address, and (d) the error took place in an application; master policy module 80 may determine, based on policy data structure 74, that the necessary recovery actions are to mark the page offline and kill the application.

An example of a more complicated error condition may involve multiple errors, such as when error abstraction data structure 72 describes both a recoverable memory error and a fatal processor error. In response, master policy module 80 may consult policy entries in policy data structure 74 for both errors. The entry for the recoverable memory error may say that, if a valid target address is present, the action is to mark the page containing that address offline and continue operation. The entry for the fatal processor error may say that a system reset is required. Master policy module 80 may determine which entry to follow, based on a predetermined general policy setting to prefer either conservative actions or aggressive actions. This general policy setting may be the same as, or in addition to, the setting for reconciling actions in policy data structure 74 with action hints in error abstraction data structure 72. Alternatively, master policy module

80 may be pre-programmed to prefer either conservative actions or aggressive actions, for instance in all cases or as a default to be used unless otherwise specified in a general policy setting. Assuming master policy module 80 is to prefer conservative actions, for the present error condition, master policy module 80 may take the most conservative action of resetting the system and not perform the memory error recovery. Master policy module 80 may follow a similar approach when reconciling one or more actions from error abstraction data structure 72 with one or more action hints from error abstraction data structure 72. Alternatively, OS 50 may be configured to prefer actions in policy data structure 74 over action hints in error abstraction data structure 72, or vice versa.

After master policy module 80 has implemented the appropriate recovery action or actions, the process may return to block 120, and operations may repeated as necessary, as described above.

As has been described, the example embodiment provides a modular framework for an OS to use in analyzing hardware errors and identifying recovery actions for those errors. Instead of using relatively monolithic OS software for handling errors, processing systems may use a modular framework such as that described, to reduce the delay and/or effort required to modify the way the OS handles errors.

Referring again to FIG. 2, the blocks for policy data structure 74 and specialized error handling modules 70 are filled with dots, to highlight that those components may be updated without any other modifications to OS 50. For example, a user may purchase OS 50 in a shrink wrapped package from the OS vendor, and install OS 50 on processing system 20. To modify the way OS 50 handles hardware errors, the user may then simply modify the policy entries in policy data structure 74 or modify one or more of the specialized modules 70 to be registered with OS 50. No changes to the shrink wrapped OS are necessary. Therefore, the user need not wait for the OS developer to develop and deliver a new or upgraded OS.

In some cases, the same basic OS may be used on multiple generations of a hardware platform, even though a later generation may include hardware and/or firmware features that an earlier generation of the hardware platform lacks. Also, the same types of error handling actions may be considered appropriate on all generations. For example, the types of actions may be classified into categories such as a log category, a mark offline category, and a reset category; and those same categories may be used by all generations of the hardware platform. However, some generations of the platform may include features that other generations don't. An error handling framework with specialized error handling modules allows different generations of processing systems with the same OS to provide different types of error handling support.

For example, a newer generation of a processing system may include a new type of bus, such as a peripheral component interconnect (PCI) Express bus, and specialized error handling modules may be used to provide specialized error handling for hardware components associated with the new bus, without requiring any changes to the basic OS. For instance, some errors involving the new features may be mapped to existing actions or action categories, and some errors may be mapped to new categories, such as an action to reset a PCI-Express adapter. Similarly, the types of errors that are mapped into the different categories may easily be changed, for example by updating a policy data structure of the OS. No changes to the OS code would be required.

Similarly, processor technology may evolve to include more extensive hardware capabilities for detecting, isolating, and reporting errors, and firmware or software may evolve to include more extensive error recovery. Similarly, software may quickly be developed to fix hardware errata issues. The disclosed framework may be used to capture the benefits of such improvements without requiring changes to the core OS.

The described framework may, in effect, decouple the features in the OS for handling hardware errors from the OS product release cycles. This framework may therefore allow hardware error architectures and the error handling software to evolve independently. Accordingly, the framework may contribute to more rapid advances in computing technology. For example, hardware and firmware features to support reliability, availability, and scalability (RAS) may be developed, tested, and deployed more rapidly than if hardware error support for the new features were delayed by OS product release cycles.

The framework may also facilitate easier and faster modifications to error handling logic, for example through simple modifications to data in a policy data structure or specialized module upgrades in the form of device driver upgrades, software patches, or similar operations for upgrading software.

In light of the principles and example embodiments described and illustrated herein, it will be recognized that the illustrated embodiments can be modified in arrangement and detail without departing from such principles. For instance, the present invention is not limited to utilization in the example embodiments described herein, but may also be used to advantage in many other types of systems. In addition, although the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, it will be apparent to those of ordinary skill in the art that numerous modifications to the processes could be applied to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, DVDs, ROM, and RAM; as well as communications media such as antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope and spirit of the following claims and all equivalents to such implementations.

What is claimed is:

1. A method comprising:
    registering a specialized module for handling hardware errors with an operating system (OS) of the processing system after the processing system has been powered on;
    receiving, at a generic error collection routine of the OS, notification of a hardware error in the processing system;
    in response to receiving notification of the hardware error at the generic error collection routine, calling the specialized module;
    retrieving information pertaining to the hardware error from one or more hardware components of the processing system;
    generating abstracted error data, based at least in part on the retrieved information; and
    determining a recovery action to be taken in response to the hardware error, the determination made by the OS, based at least in part on the abstracted error data, and also based at least in part on a policy data structure of the processing system, wherein the policy data structure associates hardware errors with corresponding predetermined actions to be performed by the OS.

2. A method according to claim 1, wherein the operation of retrieving information pertaining to the hardware error from one or more hardware components of the processing system is performed at least in part by the specialized module.

3. A method according to claim 1, wherein the operation of registering the specialized module comprises registering one or more specialized modules selected from the group consisting of:
    a specialized module to handle processor errors;
    a specialized module to handle memory errors; and
    a specialized module to handle input/output (I/O) errors.

4. A method according to claim 1, further comprising:
    performing the predetermined action specified in the policy data structure for the hardware error.

5. A method according to claim 1, wherein:
    the specialized module populates an error abstraction data structure with the abstracted error data;
    the determination of an action to be taken is performed by a master policy module of the OS; and
    the master policy module obtains the abstracted error data from the error abstraction data structure.

6. A method according to claim 1, further comprising:
    receiving firmware information pertaining to the error at the generic error collection routine; and
    passing at least part of the firmware information to the specialized module.

7. A method according to claim 6, wherein the operation of receiving firmware information comprises:
    retrieving the firmware information from firmware of the processing system, the retrieving performed at least in part by the generic error collection routine.

8. A method according to claim 1, wherein the specialized module also generates an action hint to suggest a recovery action for handling the hardware error.

9. A method according to claim 8, further comprising:
    selecting between the action hint from the specialized module and the predetermined action from the policy data structure.

10. A method according to claim 1, further comprising:
    updating the policy data structure without using the OS.

11. An apparatus comprising:
    a machine accessible medium; and
    instructions encoded in the machine accessible medium, wherein the instructions, when executed by a processing system, perform operations comprising:
    registering a specialized error handling module with an operating system (OS) in the processing system after the processing system has been powered on;
    using the specialized error handling module to collect error data from a component of the processing system and to generate abstracted error data, based at least in part on the collected error data; and
    using a master policy module of the OS to determine a recovery action to be taken, based at least in part on the abstracted error data.

12. An apparatus according to claim 11, wherein the instructions perform further operations comprising:
    receiving, at a generic error collection routine of the OS, notification of the hardware error in the processing system; and
    calling the specialized error handling module in response to receiving notification of the hardware error.

13. An apparatus according to claim 11, further comprising:
    a policy data structure that associates hardware errors with corresponding predetermined actions to be performed by the OS; and
    wherein the master policy module determines the recovery action based at least in part also on information from the policy data structure.

14. An apparatus according to claim 13, wherein the instructions perform further operations comprising:
    performing the predetermined action specified in the policy data structure for the hardware error.

15. An apparatus according to claim 13, wherein the instructions perform further operations comprising:
    updating the policy data structure without using the OS.

16. An apparatus according to claim 11, wherein the instructions register, with the OS, one or more specialized error handling modules selected from the group consisting of:
    a specialized module to handle processor errors;
    a specialized module to handle memory errors; and
    a specialized module to handle input/output (I/O) errors.

17. An apparatus according to claim 11, wherein the instructions perform further operations comprising:
    receiving firmware information pertaining to the error at the generic error collection routine; and
    passing at least part of the firmware information to the specialized error handling module.

18. An apparatus according to claim 11, wherein the specialized error handling module also generates an action hint to suggest a recovery action for handling the hardware error.

19. A processing system comprising:
an operating system (OS);
one or more specialized error handling modules to be registered with the OS after the processing system is powered on; and
a master policy module in the OS, wherein:
the specialized error handling module collects error data from a component of the processing system and generates abstracted error data, based at least in part on the collected error data; and
the master policy module determines a recovery action to be taken, based at least in part on the abstracted error data.

20. A processing system according to claim 19, further comprising at least one unarchitected feature, wherein:
the specialized error handling module collects data from the unarchitected feature of the processing system.

21. A processing system according to claim 19, wherein:
the processing system comprises hardware developed by a hardware manufacturer;
the OS comprises software developed by an OS vendor; and
the specialized error handling module comprises software provided by the hardware manufacturer.

22. A processing system according to claim 19, wherein:
the OS comprises software provided by a first organization; and
the specialized error handling module comprises software provided by a second organization.

23. A processing system according to claim 19, further comprising:
a policy data structure that associates hardware errors with corresponding predetermined actions to be performed by the OS; and
wherein the master policy module determines the recovery action based at least in part also on information from the policy data structure.

24. A processing system according to claim 23, further comprising instructions which, when executed, update the policy data structure without using the OS.

25. A processing system according to claim 19, wherein the one or more specialized error handling modules comprise at least one module selected from the group consisting of:
a specialized module to handle processor errors;
a specialized module to handle memory errors; and
a specialized module to handle input/output (I/O) errors.

26. A processing system according to claim 19, further comprising:
an error collection routine in the OS that receives a hardware error signal and, in response, calls at least one of the specialized error handling modules.

27. A processing system according to claim 19, wherein:
the error collection routine receives firmware information pertaining to the error; and
the error collection routine passes at least part of the firmware information to the specialized error handling module.

28. A processing system according to claim 19, wherein the specialized error handling module also generates an action hint to suggest a recovery action for handling the hardware error.

29. A processing system according to claim 19, further comprising:
a machine accessible medium to store at least part of the OS; and
a processor responsive to the machine accessible medium.

* * * * *